April 17, 1928.  
J. M. HARLAN  
HARROW ATTACHMENT  
Filed Jan. 25, 1927  
1,666,778
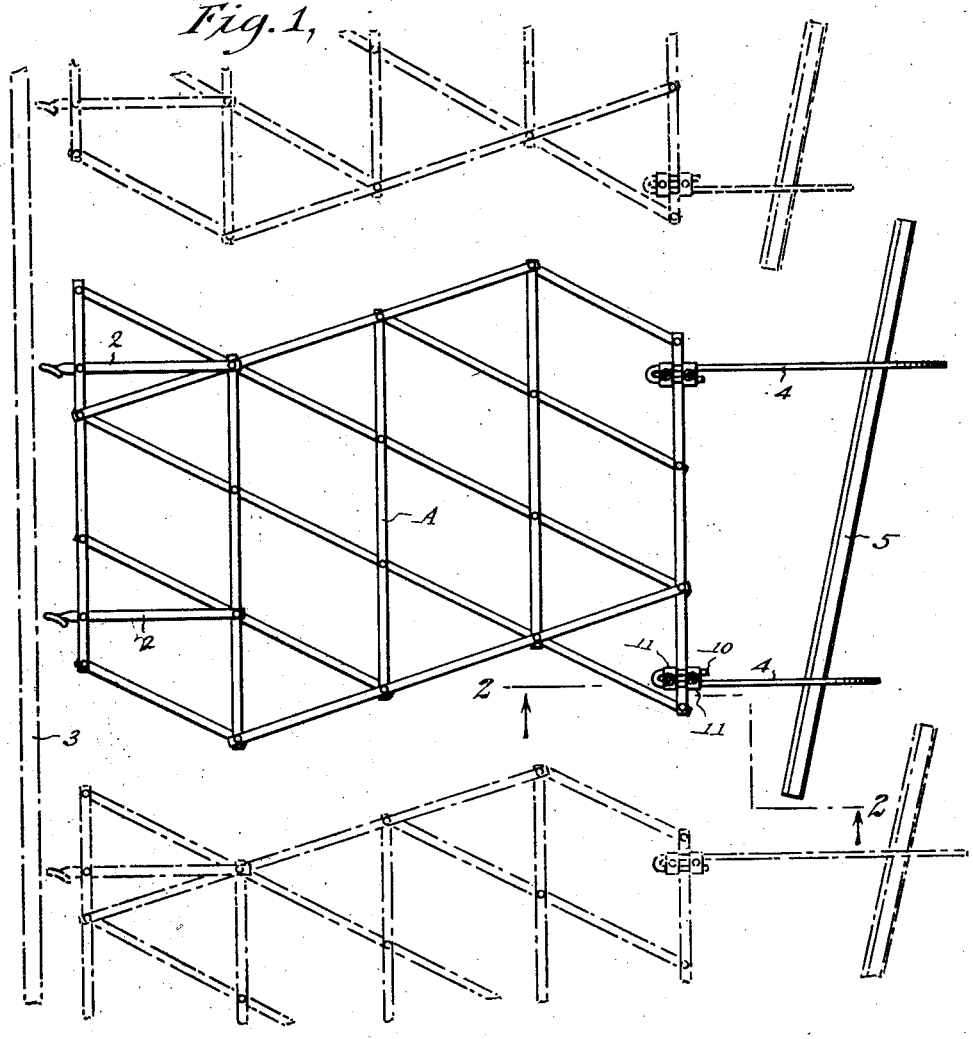
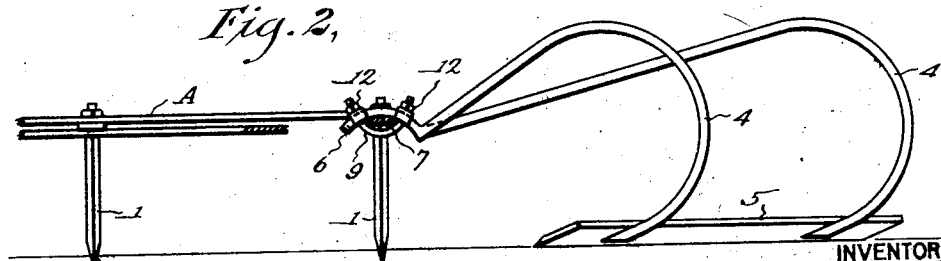
INVENTOR  
James M. Harlan  
BY  
ATTORNEY Patented Apr. 17, 1928.

1,666,778

UNITED STATES PATENT OFFICE.

JAMES M. HARLAN, OF DAYTON, WASHINGTON.

HARROW ATTACHMENT.

Application filed January 25, 1927. Serial No. 163,473.

My invention may be properly defined as an attachment for harrows, as I desire to cover broadly my improved attachment for use in connection with any harrow.

An object of the invention is to provide an attachment which is adapted for use in connection with a harrow of the type illustrated in Patent No. 1,135,755, granted April 13, 1915, to Ralph L. Benge.

With this and other objects in view, my invention consists in certain novel features of construction and combinations and arrangements of parts, which will be more fully hereinafter described and pointed out in the claims.

In the accompanying drawings—

Figure 1 is a plan view showing in full lines my invention, and illustrating in dot and dash lines how a number of such devices or units may be employed simultaneously;

Figure 2 is a view in section on the line 2—2 of Figure 1.

Figure 3 is a perspective view of one of the angular caps 11.

A represents a harrow which is preferably made up of a series of bars arranged at acute angles to each other and at their points of juncture provided with downwardly projecting harrow teeth 1. This harrow A is provided with devices 2 at its forward end for coupling engagement with the harness of draft animals or with a bar 3 to which a number of such harrows may be coupled when used simultaneously.

At the rear of the harrow A I provide a pair of goosenecks 4, 4, supporting at their lower ends a scraper or blade 5, and as one of these goosenecks is appreciably smaller than the other it permits the blade or scraper to be located at an angle when secured to the free ends of said goosenecks.

I would call particular attention to the construction of these goosenecks at their forward ends and the means for coupling them to the harrow, which is illustrated in detail in Figure 2 of the drawing. The forward ends of the goosenecks 4, 4 are curved in the arc of a circle, as indicated at 6, and positioned across a bar 7 of the harrow A.

The forward extremities of the goosenecks at their curved end portions have their ends bent backwardly, constituting tongues which lie parallel to the main portions of the goosenecks and providing a space between said tongues and the main portions of the goosenecks for the accommodation of securing devices, as will now be explained.

A bolt 9 of the type which is commonly known as a U-bolt but which has a greater spread than the ordinary U-bolt is positioned under the bar 7 of the harrow with its ends located between the goosenecks 4 and the rearwardly projecting tongues 10 thereof. The free ends of these bolts are also projected through perforated angular caps 11 which straddle the goosenecks 4 and the tongues 10 and located at opposite sides of the bar 7. Nuts 12 are screwed onto the free ends of these bolts 9 and clamp all the parts together.

By reason of the curved or arcuate forms of the ends of the goosenecks and the U-bolts a certain amount of pivotal adjustment is permitted to the goosenecks on the harrow to allow them to be secured at just the proper angle to support the blade at the desired elevation, and when once adjusted they can be effectually secured by screwing home the nuts 12.

By reason of the construction above described, the blade supporting attachment may be easily and quickly secured to the harrow and a permanent rigid connection will be had capable of such adjustment as may be desirable, and as above stated I do not limit myself to the particular use to which this attachment or the implement as a whole is to be used.

While I have illustrated what I believe to be a preferred embodiment of my invention it is obvious that various changes and alterations might be made in the general form of the parts described without departing from the invention and hence I do not limit myself to the precise details set forth but consider myself at liberty to make such changes and alterations as fairly fall within the spirit and scope of the appended claims.

I claim:

1. The combination with a harrow of a pair of goosenecks secured to the rear bar of the harrow, a blade secured to the goosenecks and located at an angle to the goosenecks, said goosenecks at their forward ends reversely bent and curved in the arc of a circle and located over a bar of the harrow, a U-bolt positioned under the bar of the harrow and projecting through the curved ends of the goosenecks, perforated caps on the curved portions of the goosenecks at opposite sides of the bar, and nuts screwed onto said bolt against said caps.

2. An attachment for harrows, including a pair of goosenecks, a bar connecting the goosenecks at their rear ends, the forward ends of said goosenecks curved in the arc of a circle and adapted to be located over a bar of the harrow, and coupling devices extending under the bar of the harrow and engaging the curved portions of the goosenecks at the front and rear of the bar.

JAMES M. HARLAN.